(12) United States Patent
Zhamu et al.

(10) Patent No.: US 9,190,667 B2
(45) Date of Patent: Nov. 17, 2015

(54) GRAPHENE NANOCOMPOSITES FOR ELECTROCHEMICAL CELL ELECTRODES

(75) Inventors: Aruna Zhamu, Centerville, OH (US); Bor Z. Jang, Centerville, OH (US); Jinjun Shi, Columbus, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 538 days.

(21) Appl. No.: 12/220,651

(22) Filed: Jul. 28, 2008

(65) Prior Publication Data

US 2010/0021819 A1 Jan. 28, 2010

(51) Int. Cl.
*H01M 4/13* (2010.01)
*H01M 4/587* (2010.01)
*H01G 9/04* (2006.01)
*H01G 11/36* (2013.01)
*H01G 11/38* (2013.01)
*H01G 11/42* (2013.01)
*H01M 4/133* (2010.01)
*H01M 4/1393* (2010.01)
(Continued)

(52) U.S. Cl.
CPC ............... *H01M 4/587* (2013.01); *H01G 9/058* (2013.01); *H01G 11/36* (2013.01); *H01G 11/38* (2013.01); *H01G 11/42* (2013.01); *H01M 4/133* (2013.01); *H01M 4/1393* (2013.01); *H01M 4/362* (2013.01); *H01M 4/621* (2013.01); *H01M 10/0525* (2013.01); *H01M 2004/021* (2013.01); *H01M 2004/022* (2013.01); *Y02E 60/122* (2013.01); *Y02E 60/13* (2013.01)

(58) Field of Classification Search
CPC ............ H01M 10/0525; H01M 4/133; H01M 10/054; H01M 16/00; H01M 2004/021; H01M 2004/022; H01M 4/0402; H01M 4/1393; H01M 4/362
USPC ................. 429/306, 309, 209, 212, 213, 217, 429/231.8, 231.95, 249
See application file for complete search history.

(56) References Cited

U.S. PATENT DOCUMENTS 2,798,878 A 7/1957 Hummers
5,344,726 A 9/1994 Tanaka et al.
(Continued)

OTHER PUBLICATIONS

U.S. Appl. No. 11/787,442, filed Apr. 17, 2007, A. Zhamu, et al.
(Continued)

*Primary Examiner* — Patrick Ryan
*Assistant Examiner* — Ben Lewis
(74) *Attorney, Agent, or Firm* — Mark Levy; Thompson Hines

(57) ABSTRACT

A composite composition for electrochemical cell electrode applications, the composition comprising multiple solid particles, wherein (a) a solid particle is composed of graphene platelets dispersed in or bonded by a first matrix or binder material, wherein the graphene platelets are not obtained from graphitization of the first binder or matrix material; (b) the graphene platelets have a length or width in the range of 10 nm to 10 μm; (c) the multiple solid particles are bonded by a second binder material; and (d) the first or second binder material is selected from a polymer, polymeric carbon, amorphous carbon, metal, glass, ceramic, oxide, organic material, or a combination thereof. For a lithium ion battery anode application, the first binder or matrix material is preferably amorphous carbon or polymeric carbon. Such a composite composition provides a high anode capacity and good cycling response. For a supercapacitor electrode application, the solid particles preferably have meso-scale pores therein to accommodate electrolyte.

23 Claims, 8 Drawing Sheets

(51) Int. Cl.
   *H01M 4/36* (2006.01)
   *H01M 4/62* (2006.01)
   *H01M 10/0525* (2010.01)
   *H01M 4/02* (2006.01)

(56) References Cited

U.S. PATENT DOCUMENTS

| | | | |
|---|---|---|---|
| 5,635,151 | A | 6/1997 | Zhang et al. |
| 5,908,715 | A | 6/1999 | Liu et al. |
| 5,965,296 | A | 10/1999 | Nishimura et al. |
| 6,031,711 | A | 2/2000 | Tennent et al. |
| 6,087,043 | A | 7/2000 | Tossici et al. |
| 6,099,960 | A | 8/2000 | Tennent et al. |
| 6,205,016 | B1 | 3/2001 | Niu |
| 6,757,154 | B2 | 6/2004 | Reynolds, III et al. |
| 6,830,595 | B2 | 12/2004 | Reynolds, III |
| 7,071,258 | B1 * | 7/2006 | Jang et al. ............ 524/496 |
| 7,206,189 | B2 | 4/2007 | Reynolds, III et al. |
| 2008/0220329 | A1 * | 9/2008 | Kojima et al. ......... 429/188 |
| 2009/0155578 | A1 * | 6/2009 | Zhamu et al. ......... 428/336 |

OTHER PUBLICATIONS

U.S. Appl. No. 11/800,728, filed May 8, 2007, A. Zhamu, et al.
U.S. Appl. No. 11/879,680, filed Jul. 19, 2007, A. Zhamu, et al.
U.S. Appl. No. 11/881,388, filed Jul. 27, 2007, A. Zhamu, et al.
U.S. Appl. No. 11/881,389, filed Jul. 27, 2007, A. Zhamu, et al.
U.S. Appl. No. 11/881,390, filed Jul. 27, 2007, A. Zhamu, et al.
U.S. Appl. No. 11/499,861, filed Aug. 4, 2006, L. Song, et al.
T. Zheng, Q. Zhong, and J. R. Dahn, J. Electrochem. Soc. 142 (1995) L211.
J. S. Xue and J. R. Dahn, J. Electrochem. Soc. 142 (1995) 3668.
F. Disma, L. Aymard, and J.-M. Tarascon, J. Electrochem. Soc., 143 (1996) 3959.
E. Peled, C. Menachem, a. Melman, J. Electrochem. Soc. 143 (1996) L4.
U. Rothlisberger and M. L. Klein, J. Am. Chem. Soc., 117, 42 (1995).
R. Yazami and M. Deschamps, J. Power Sources, 54 (1995) 411.
Y. Ein-Eli, V.R. Koch, J. Electrochem. Soc. 144 (1997) 2968.
C. Menachem, Y. Wang, J. Floners, E. Peled, S.G. Greenbaum, J. Power Sources, 76 (1998) 180.
H. Buqa, P. Golob, M. Winter, J.O. Bensenhard, J. Power Sources, 97-98 (2001) 122.
T. Takamura, H. Awano, T. Ura, K. Sumiya, J. Power Sources, 68 (1997) 114.
Y. P. Wu, C. Jiang, C. Wan and E. Tsuchida, Electrochem. Commu., 2 (2000) 272-275.
Y. P. Wu, C. Jiang, C. Wan and E. Tsuchida, "A Green Method for the Preparation of Anode Materials for Lithium Ion Batteries," J. Materials Chem., 11 (2001) 1233-1236.
Y. P. Wu, C.Y. Jiang, C.R. Wan, R. Holze, J. Appl. Electrochem., 32 (2002) 1011.
Y. P. Wu, C. Jiang, C. Wan, and R. Holze, Electrochem. Commu., 4 (2002) 483-487.
Y. P. Wu, E. Rahm, and R. Holze, J. Power Source, 114 (2003) 228-236.

* cited by examiner

GRAPHENE NANOCOMPOSITES FOR ELECTROCHEMICAL CELL ELECTRODES

This invention is based on the research result of a US Department of Energy (DOE) Small Business Innovation Research (SBIR) project. The US government has certain rights on this invention.

FIELD OF THE INVENTION

The present invention provides a graphene nanocomposite material for use in an electrochemical cell electrode, such as an anode of a secondary battery, particularly a lithium-ion battery, and an electrode of a supercapacitor.

BACKGROUND

The description of the prior art will be primarily based on the list of references presented at the end of this section. Since the present invention is primarily related to the lithium ion battery and supercapacitor, the discussion on the prior art will be divided into two parts:

Part A. Secondary Battery (Particularly, Lithium Ion Battery)

Concerns over the safety of earlier lithium secondary batteries led to the development of lithium ion secondary batteries, in which pure lithium metal sheet or film was replaced by carbonaceous materials as an anode. There are three fundamentally distinct types of carbonaceous anode materials: (a) graphite, (b) amorphous carbon, and (c) graphitized carbon.

The first type of carbonaceous material includes primarily natural graphite and synthetic graphite (or artificial graphite, such as highly oriented pyrolitic graphite, HOPG) that can be intercalated with lithium and the resulting graphite intercalation compound (GIC) may be expressed as $Li_xC_6$, where x is typically less than 1. In order to minimize the loss in energy density due to the replacement of lithium metal with the GIC, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g.

Carbon anodes can have a long cycle life due to the presence of a protective surface-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. they can no longer be the active element for charge transfer. Therefore, it is desirable to use a minimum amount of lithium for the formation of an effective SEI layer. In addition to SEI formation, $Q_{ir}$ has been attributed to graphite exfoliation caused by electrolyte/solvent co-intercalation and other side reactions [Refs. 1-4].

The second type of anode carbonaceous material is amorphous carbon, which contains no or very little micro- or nano-crystallites. This type includes the so-called "soft carbon" and "hard carbon." The soft carbon is a carbon material that can be readily graphitized at a temperature of 2,500° C. or higher. The hard carbon is a carbon material that cannot be graphitized even at a temperature higher than 2,500° C. In actuality, however, the so-called "amorphous carbons" commonly used as anode active materials are typically not purely amorphous, but contain some small amount of micro- or nano-crystallites. A crystallite is composed of a small number of graphene sheets (basal planes) that are stacked and bonded together by weak van der Waals forces. The number of graphene sheets varies between one and several hundreds, giving rise to a c-directional dimension (thickness Lc) of typically 0.34 nm to 100 nm. The length or width (La) of these crystallites is typically between tens of nanometers to microns.

Among this class of carbon materials, soft and hard carbons made by low-temperature pyrolysis (550-1,000° C.) exhibit a reversible capacity of 400-800 mAh/g in the 0-2.5 V range [Refs. 1-3]. Dahn et al. have made the so-called house-of-cards carbonaceous material with enhanced capacities approaching 700 mAh/g [Refs. 1,2]. Tarascon's research group obtained enhanced capacities of up to 700 mAh/g by milling graphite, coke, or carbon fibers [Ref. 3]. Dahn et al. explained the origin of the extra capacity with the assumption that in disordered carbon containing some dispersed graphene sheets (referred to as house-of-cards materials), lithium ions are adsorbed on two sides of a single graphene sheet [Refs. 1,2]. It was also proposed that Li readily bonded to a proton-passivated carbon, resulting in a series of edge-oriented Li—C—H bonds. This provides an additional source of $Li^+$ in some disordered carbons [Ref. 5]. Other researchers suggested the formation of Li metal mono-layers on the outer graphene sheets [Ref. 6] of graphite nano-crystallites. The amorphous carbons of Dahn et al. were prepared by pyrolyzing epoxy resins and may be more correctly referred to as polymeric carbons. Polymeric carbon-based anode materials were also studied by Zhang, et al. [Ref. 16] and Liu, et al. [Ref. 17].

The following mechanisms for the extra capacity over the theoretical value of 372 mAh/g have been proposed [Ref. 4]: (i) lithium can occupy nearest neighbor sites; (ii) insertion of lithium species into nano-scaled cavities; (iii) lithium may be adsorbed on both sides of single layer sheets in very disordered carbons containing large fractions of single graphene sheets (like the structure of a house of cards) [Refs. 1,2]; (iv) correlation of H/C ratio with excess capacity led to a suggestion that lithium may be bound somehow in the vicinity of the hydrogen atoms (possible formation of multi-layers of lithium on the external graphene planes of each crystallite in disordered carbons) [Ref. 6]; and (vi) accommodation of lithium in the zigzag and armchair sites [Ref. 4].

Despite exhibiting a high capacity, an amorphous carbon has a low electrical conductivity (high charge transfer resistance) and, hence, resulting in a high polarization or internal power loss. Conventional amorphous carbon-based anode materials also tend to give rise to a high irreversible capacity.

The third type of anode carbonaceous material, graphitized carbon, includes meso-carbon microbeads (MCMBs) and graphitized carbon fibers (or, simply, graphite fibers). MCMBs are usually obtained from a petroleum heavy oil or pitch, coal tar pitch, or polycyclic aromatic hydrocarbon material. When such a precursor pitch material is carbonized by heat treatment at 400° to 500°, micro-crystals called mesophase micro-spheres are formed in a non-crystalline pitch matrix. These mesophase micro-spheres, after being isolated from the pitch matrix (pitch matrix being soluble in selected solvents), are often referred to as meso-carbon microbeads (MCMBs). The MCMBs may be subjected to a further heat treatment at a temperature in the range of 500° C. and 3,000° C. In order to obtain a stably reversible capacity in an anode, commercially available MCMBs are obtained from heat-treating mesophase carbon spheres at a temperature typically above 2,000° C. and more typically above 2,500° C. for an extended period of time. Graphitized carbons have several drawbacks:

(1) Due to such time-consuming and energy-intensive procedures, MCMBs have been extremely expensive. Likewise, the production of all types of graphite fibers (vapor-grown, rayon-based, pitch based, and polyacrylonitrile-based) is also tedious and energy-intensive and the products are very expensive.

(2) The production of meso-carbon microbeads having a very small diameter, particularly 5 μm or less has been difficult. When the concentration of optically anisotropic small spheres (meso-phase spheres) increases, the small spheres tend to coalesce and precipitate to produce bulk mesophase and separation of small spheres becomes difficult. This is likely the reason why MCMBs with bead size less than 5 μm are not commercially available. Smaller anode active material particles are essential to high-rate capacity of a lithium ion battery.

(3) Furthermore, both MCMBs and graphite fibers give rise to an anode capacity of typically lower than 350 mAh/g and more typically lower than 320 mAh/g.

Therefore, an urgent need exists for a carbon/graphite-based anode material that has the following highly desirable features: low cost, mass-producibility, high reversible capacity, low irreversible capacity, small particle sizes (for high-rate capacity), compatibility with commonly used electrolytes, and long charge-discharge cycle life.

Part B. Supercapacitor

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The EC must also store sufficient energy to provide an acceptable driving range. To be cost- and weight-effective compared to additional battery capacity they must combine adequate specific energy and specific power with long cycle life, and meet cost targets as well. Specifically, it must store about 400 Wh of energy, be able to deliver about 40 kW of power for about 10 seconds, and provide high cycle-life (>100,000 cycles).

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1-2 nm, thus forming an extremely small effective "plate separation." In some ECs, stored energy is further augmented by pseudo-capacitance effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance.

Experience with ECs based on activated carbon electrodes shows that the experimentally measured capacitance is always much lower than the geometrical capacitance calculated from the measured surface area and the width of the dipole layer. For very high surface area carbons, typically only about ten percent of the "theoretical" capacitance was observed. This disappointing performance is believed to be related to the presence of micro-pores and ascribed to inaccessibility of some pores by the electrolyte, wetting deficiencies, and/or the inability of a double layer to form successfully in pores in which the oppositely charged surfaces are less than about 2 nm apart. In activated carbons, depending on the source of the carbon and the heat treatment temperature, a surprisingly high amount of surface can be in the form of such inaccessible micro-pores.

It would be desirable to produce an EC that exhibits greater geometrical capacitance using a carbon based electrode having a high accessible surface area, high porosity, and reduced or no micro-pores. It would be further advantageous to develop carbon-based nano-structures that are conducive to the occurrence of pseudo-capacitance effects such as the redox charge transfer.

In this context, carbon nanotubes (CNTs) are of great interest. CNTs are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. Nanotubes typically also have a relatively high aspect ratio (length/diameter ratio). Due to these properties, the use of CNTs as reinforcements in composite materials for both structural and functional applications would be advantageous. In particular, CNTs are being studied for electrochemical supercapacitor electrodes due to their unique properties and structure, which include high surface area, high conductivity, and chemical stability. Capacitance values from 20 to 180 F/g have been reported, depending on CNT purity and electrolyte, as well as on specimen treatment such as $CO_2$ physical activation, KOH chemical activation, or exposure to nitric acid, fluorine, or ammonia plasma. Carbon nano-fibers (CNFs) and graphitic nano-fibers (GNFs), two thicker-diameter cousins of CNTs, have also been investigated as potential EC electrode materials.

Conducting polymers, such as polyacetylene, polypyrrole, polyaniline, polythiophene, and their derivatives, are also common electrode materials for supercapacitors. The modification of CNTs with conducting polymers is one way to increase the capacitance of the composite resulting from redox contribution of the conducting polymers. In the CNT/conducting polymer composite, CNTs are electron acceptors while the conducting polymer serves as an electron donor. A charge transfer complex is formed between CNTs in their ground state and aniline monomer. A number of studies on CNT/conducting polymer composites for electrochemical capacitor applications have been reported: e.g., [Refs. 21-28] are related to CNT-, CNF-, or GNF-based EC electrodes.

However, there are several drawbacks associated with carbon nano-tubes or nano-fibers for EC electrode applications. First, both nano-tubes and nano-fibers are extremely expensive. Second, both materials tend to form a tangled mess resembling a hairball, which is difficult to work with. For CNTs, the interior surface is not accessible by electrolyte and, hence, not capable of developing double-layer charges. These and other difficulties have limited efforts toward commercialization of supercapacitors containing nano-tube or nano-fiber based electrodes.

As a less expensive material, macroscopic scale flexible graphite sheet has been used in an integrated electrode/current collector for EC applications, wherein the flexible graphite sheet is used as a substrate to support thereon an electrode active material (e.g., activated carbon particles) [Refs. 29-31]. Actually, these carbon particles are embedded on the surface or into the bulk of a flexible graphite sheet. The "flexible graphite" is typically obtained by first treating natural graphite particles with an intercalating agent (intercalant) that penetrates into the inter-planar spacings of the graphite crystals to form a graphite intercalated compound (GIC). The GIC is then exposed to a thermal shock, up to a temperature of typically 800-1,100° C. to expand the intercalated particles by typically 80-300 times in the direction perpendicular to the graphene layers (basal planes) of a graphite crystal structure. The resulting expanded or exfoliated graphite particles are vermiform in appearance and are, therefore, commonly referred to as graphite worms. Hereinafter, the term "exfoliated graphite" will be used interchangeably with the term "expanded graphite." The worms may be re-compressed together into flexible sheets which can be formed and cut into various shapes. These thin sheets (foils or films) are commonly referred to as flexible graphite. Flexible graphite can be wound up on a drum to form a roll of thin film, just like a roll of thin plastic film or paper. The flexibility or compressibility of flexible graphite or exfoliated graphite enables the hard solid carbon particles to be embedded into the flexible graphite sheet when solid carbon particles and exfoliated graphite are combined and calendared, roll-pressed, or embossed together. However, such a combined electrode/current collector as disclosed in [Refs. 29-31] has several major shortcomings:

(1) The exfoliated graphite or flexible graphite sheet cited in these patents is a passive material that is used solely as a substrate or binder material to hold the electrode active material together for forming an integral member (electrode/current collector). The flexible graphite or exfoliated graphite itself is not used as an electrode active material, i.e., it does not provide the diffuse double layer charges and, hence, does not contribute to the double layer capacitance.

(2) In order for a flexible graphite sheet or exfoliated graphite particles to hold activated carbon particles together, the total amount of exfoliated graphite must be at least 50% by volume or more. Individual graphite particles are a solid, not a liquid adhesive. Although exfoliated graphite particles themselves can be re-compressed together to form a cohered body, the resulting flexible graphite sheet is normally very fragile. When a large amount of exfoliated graphite is used, the relative proportion of the electrode active material (the material that actually contributes to double layer capacitance) is small. Consequently, the effective energy density of the resulting supercapacitor is significantly curtailed.

(3) By embedding activated carbon particles into a flexible graphite sheet or mixing activated carbon particles with exfoliated graphite particles, one tends to seal off the pores of activated carbon particles that have surface openings supposedly functioning to accommodate the liquid electrolyte. Mixing or embedding significantly reduces the amount of carbon particle pores that are designed to be accessible by liquid electrolyte, thereby reducing the effective electrolyte-electrode interface areas where double layer charges can be formed.

(4) The activated carbon particles utilized by Reynolds, et al. [Refs. 9-11] were typically in the range of 600 µm and 900 µm. They were too big to penetrate the inter-layer spaces (<2.8 nm within an inter-planar spacing of 0.335 nm) between two graphene planes of un-expanded graphite crystallites. They were also too big to penetrate the space (typically <10 µm) between graphite flakes (each flake comprising a multiplicity of graphene sheets bonded by van der Waal's forces). With a maximum average expansion ratio of 300, the original inter-planar spacing of 0.335 nm would become at most 100 nm on average. In rare cases, there could be some pores as large as 10 µm, but these pores are still too small to accept activated solid carbon particles. In actuality, the activated carbon particles are simply squeezed by and held in place between clusters of expanded graphite flakes. Of course, such a configuration is advantageous in that it provides a substrate with good electrical conductivity and this substrate functions as a current collector as well.

Instead of trying to develop much lower-cost processes for making CNTs, the applicants and co-workers have worked diligently to develop alternative nano-scaled carbon materials that exhibit comparable properties, but are more readily available and at much lower costs. This development work has led to the discovery of processes for producing individual nano-scaled graphite planes (individual graphene sheets) and stacks of multiple nano-scaled graphene sheets, which are collectively called nano-sized graphene plates (NGPs). The structures of these materials may be best visualized by making a longitudinal scission on the single-wall or multi-wall of a nano-tube along its tube axis direction and then flattening up the resulting sheet or plate. In practice, NGPs are obtained from a precursor material, such as minute graphite particles, using a low-cost process, but not via flattening of CNTs. One of the cost-effective processes is exfoliation of graphite to produce graphite worms of loosely connected flakes, followed by separation of these flakes into isolated (unconnected) graphene platelets using mechanical means (air jet milling, rotating-blade shearing, etc). These nano materials could potentially become cost-effective substitutes for CNTs or other types of nano-rods for various scientific and engineering applications. These diligent efforts have led to the following patent applications [Refs. 32-40]:

For instance, Jang, et al. [Ref. 33] disclosed a process to readily produce NGPs in large quantities. The process includes the following procedures: (1) providing a graphite powder containing fine graphite particles preferably with at least one dimension smaller than 200 µm (most preferably smaller than 1 µm); (2) exfoliating the graphite crystallites in these particles in such a manner that at least two graphene planes are fully separated from each other, and (3) mechanical attrition (e.g., ball milling) of the exfoliated particles to become nano-scaled, resulting in the formation of NGPs with platelet thickness smaller than 100 nm. The starting powder type and size, exfoliation conditions (e.g., intercalation chemical type and concentration, temperature cycles, and the mechanical attrition conditions (e.g., ball milling time and intensity)) can be varied to generate, by design, various NGP materials with a wide range of graphene plate thickness, width and length values. We have successfully prepared NGPs with an average length in the range of 1 to 20 μm). However, the length or width can be smaller than 500 nm and, in several cases, smaller than 100 nm. Ball milling is known to be an effective process for mass-producing ultra-fine powder particles. The processing ease and the wide property ranges that can be achieved with NGP materials make them promising candidates for many important engineering applications. The electronic, thermal and mechanical properties of NGP materials are expected to be comparable to those of carbon nano-tubes; but NGPs will be available at much lower costs and in larger quantities.

After an extensive and in-depth study of the electrochemical response of NGPs and their composites, we have found that a certain class of meso-porous composites containing NGPs as electrode ingredients exhibit superior charge double layer-type supercapacitance and redox charge transfer-type pseudo-capacitance. Some preferred compositions were described in an earlier application [40]. These electrode materials were made by simply bonding NGPs together with a binder material to form a flat sheet, layer, or plate as an electrode.

By contrast, the present invention provides a graphene nanocomposite composition that is made first by combining NGPs with a first binder or matrix material to form micron-sized solid particles using, for instance, an atomization or aerosol formation technique. These nanocomposite solid particles are substantially spherical or ellipsoidal in shape and are of approximately 1-20 μm in size (preferably smaller than 5 μm in diameter or long axis). Preferably, these particles (e.g., with NGPs bonded by a polymer, coal tar pitch, or meso-phase pitch) are then subjected to a carbonization treatment to convert the binder material to an amorphous carbon. In many cases, this carbonization also produces micro- or meso-pores in the binder material phase. The resulting nano-composite particles are now composed of NGPs bonded by a carbon phase. These nanocomposite solid particles are then bonded together with a second binder material (e.g., styrene-butadiene rubber, SBR, poly(tetrafluoroethylene), PTFE, or poly(vinylidene fluoride), PVDF). Surprisingly, these nano-composites are superior to the already outstanding meso-porous composites invented by us earlier [Ref. 40]. These nanocomposite particles are also superior to carbon black or activated carbon particles when used as an electrode active material for a supercapacitor.

In addition, these nanocomposite particles are superior to meso-carbon micro-beads (MCMBs), conventional fine graphite particles, and conventional graphite spherules when used as an anode active material for a lithium ion battery. For lithium ion battery anode applications, the NGP-containing solid particles do not have to be porous. They can be relatively pore-free solid particles. The presently invented solid nano-composite particles can be readily mass-produced and are of low cost. Solid particles can be readily made to be smaller than 5 μm if the NGPs chosen are smaller than 2 or 3 μm in size, which are readily available. When used as an anode active material, they exhibit a high reversible capacity, a low irreversible capacity, good compatibility with commonly used electrolytes (no graphite layer exfoliation phenomenon), and a long charge-discharge cycle life.

The present invention provides electrodes for both high-performance lithium ion battery and supercapacitor electrodes. No known prior art graphite or carbon materials are so versatile in electrochemical cell applications.

REFERENCES:

1. T. Zheng, Q. Zhong, and J. R. Dahn, J. Electrochem. Soc. 142 (1995) L211.
2. J. S. Xue and J. R. Dahn, J. Electrochem. Soc. 142 (1995) 3668.
3. F. Disma, L. Aymard, and J.-M. Tarascon, J. Electrochem. Soc., 143 (1996) 3959.
4. E. Peled, C. Menachem, A. Melman, J. Electrochem. Soc. 143 (1996) L4.
5. U. Rothlisberger and M. L. Klein, J. Am. Chem. Soc., 117, 42 (1995).
6. R. Yazami and M. Deschamps, J. Power Sources, 54 (1995) 411.
7. Y. Ein-Eli, V. R. Koch, J. Electrochem. Soc. 144 (1997) 2968.
8. C. Menachem, Y. Wang, J. Floners, E. Peled, S. G. Greenbaum, J. Power Sources, 76 (1998) 180.
9. H. Buqa, P. Golob, M. Winter, J. O. Bensenhard, J. Power Sources, 97-98 (2001) 122.
10. T. Takamura, H. Awano, T. Ura, K. Sumiya, J. Power Sources, 68 (1997) 114.
11. Y. P. Wu, C. Jiang, C. Wan and E. Tsuchida, "Effects of catalytic oxidation on the electrochemical performance of common natural graphite as an anode material for lithium ion batteries," Electrochem. Commu., 2 (2000) 272-275.
12. Y. P. Wu, C. Jiang, C. Wan and E. Tsuchida, "A Green Method for the Preparation of Anode Materials for Lithium Ion Batteries," J. Materials Chem., 11 (2001) 1233-1236.
13. Y. P. Wu, C. Y. Jiang, C. R. Wan, R. Holze, J. Appl. Electrochem., 32 (2002) 1011.
14. Y. P. Wu, C. Jiang, C. Wan, and R. Holze, Electrochem. Commu., 4 (2002) 483-487.
15. Y. P. Wu, E. Rahm, and R. Holze, J. Power Source, 114 (2003) 228-236.
16. Zhang, et al., "Carbon Electrode Materials for Lithium Battery Cells and Method of Making Same," U.S. Pat. No. 5,635,151 (Jun. 3, 1997).
17. Lui, et al., "Composite Carbon Materials for Lithium Ion Batteries, and Method of Producing Same," U.S. Pat. No. 5,908,715 (Jun. 1, 1999).
18. R. Tossici, et al., "Lithium-ion Rechargeable Battery with Carbon-Based Anode," U.S. Pat. No. 6,087,043 (Jul. 11, 2000).
19. Tanaka, et al., "Carbon Anode for Secondary Battery," U.S. Pat. No. 5,344,726 (Sep. 6, 1994).
20. Nishimura, et al., "Nonaqueous Secondary Battery and a Method of Manufacturing a Negative Electrode Active Material," U.S. Pat. No. 5,965,296 (Oct. 12, 1999).
21. K. H. An, et al., "Electrochemical Properties of High-Power Supercapacitors Using Single-Walled CNT Electrodes," Advanced Functional Materials, 11 (No. 5) (October 2001) 387-392.
22. G. Z. Chen, "Carbon Nanotube and Polypyrrole Composites: Coating and Doping," Advanced Materials, 12 (No. 7) (2000) 522-526.
23. C. Zhou, et al., "Functionalized Single Wall CNTs Treated with Pyrrole for Electrochemical Supercapacitor Membranes," Chemistry of Materials, 17 (2005) 1997-2002.

24. K. Jurewicz, et al., "Supercapacitors from Nanotubes/ Polypyrrole Composites," Chemical Physics Letters, 347 (October 2001) 36-40.
25. J. E. Huang, et al., "Well-dispersed Single-walled CNT/Polyaniline Composite Films," Carbon, 41 (2003) 2731-2736.
26. H. Tennent, et al., "Graphitic Nano-fibers in Electrochemical Capacitors," U.S. Pat. No. 6,031,711 (Feb. 29, 2000).
27. H. Tennent, et al., "High Surface Area Nanofibers, Methods of Making, Methods of Using and Products Containing Same," U.S. Pat. No. 6,099,960 (Aug. 8, 2000).
28. C. M. Niu, "Fibril Composite Electrode for Electrochemical Capacitors," U.S. Pat. No. 6,205,016 (Mar. 20, 2001).
29. R. A. Reynolds, III, "Method of Making Composite Electrode and Current Collectors," U.S. Pat. No. 6,830,595 (Dec. 14, 2004).
30. R. A. Reynolds, III, et al., "Double-Layer Capacitor Component and Method for Preparing Them," U.S. Pat. No. 6,757,154 (Jun. 29, 2004).
31. R. A. Reynolds, III, "Composite Electrode and Current Collectors and Processes for Making the Same," U.S. Pat. No. 7,206,189 (Apr. 17, 2007).
32. B. Z. Jang and W. C. Huang, "Nano-scaled Graphene Plates," U.S. Pat. No. 7,071,258 (Jul. 4, 2006).
33. B. Z. Jang, L. X. Yang, S. C. Wong, and Y. J. Bai, "Process for Producing Nano-scaled Graphene Plates," U.S. Ser. No. 10/858,814 (Jun. 3, 2004).
34. Aruna Zhamu, JinJun Shi, Jiusheng Guo, and Bor Z. Jang, "Low-Temperature Method of Producing Nano-scaled Graphene Platelets and Their Nanocomposites," U.S. Ser. No. 11/787,442 (Apr. 17, 2007).
35. Aruna Zhamu, Jinjun Shi, Jiusheng Guo and Bor Z. Jang, "Method of Producing Exfoliated Graphite, Flexible Graphite, and Nano-Scaled Graphene Plates," U.S. Ser. No. 11/800,728 (May 8, 2007).
36. Aruna Zhamu, Joan Jang, Jinjun Shi,and Bor Z. Jang, "Method of Producing Ultra-thin Nano-Scaled Graphene Platelets," U.S. Ser. No. 11/879,680 (Jul. 19, 2007).
37. Aruna Zhamu, Joan Jang, and Bor Z. Jang, "Electrochemical Method of Producing Ultra-thin Nano-Scaled Graphene Platelets," U.S. Ser. No. 11/881,388 (Jul. 27, 2007).
38. Aruna Zham and Bor Z. Jang, "Environmentally Benign Chemical Method of Producing Exfoliated Graphite, Flexible Graphite, and Nano-Scaled Graphene Platelets," U.S. Ser. No. 11/881,389 (Jul. 27, 2007).
39. Aruna Zham and Bor Z. Jang, "Environmentally Benign Graphite Intercalation Compound Composition for Exfoliated Graphite, Flexible Graphite, and Nano-Scaled Graphene Platelets," U.S. Ser. No. 11/881,390 (Jul. 27, 2007).
40. Lulu Song, A. Zhamu, Jiusheng Guo, and B. Z. Jang "Nano-scaled Graphene Plate Nanocomposites for Supercapacitor Electrodes" U.S. Ser. No. 11/499,861 (Aug. 7, 2006).

SUMMARY OF THE INVENTION

The present invention provides a nano graphene platelet nanocomposite composition for electrochemical cell electrode applications. The composition comprises a solid particle of nano-scaled graphene platelets (NGPs) dispersed in, or bonded by, a first matrix or binder material. The NGPs are pre-fabricated prior to mixing with an intended matrix or binder material. They occupy a weight fraction of 2% to 98% of the total nanocomposite weight. They are not obtained by graphitizing this binder or matrix material, as in the case of the conventional MCMB production. This is a non-obvious advantage since the present nanocomposite composition exhibits surprisingly high and reversible anode capacity, much higher than that of state-of-the-art MCMBs. Furthermore, NGPs used in the present invention can come from natural graphite that is already highly graphitized. We only need to separate the graphene sheets and then disperse them in a carbonaceous matrix. By contrast, a good MCMB material requires a tedious, energy-intensive, and expensive graphitization process at a high temperature (typically >2,500° C.). Even with such an expensive treatment, the electrochemical performance of these MCMBs are still inferior to that of the presently invented NGP nanocomposite.

Preferably, the nanocomposite solid particles are substantially of spherical or ellipsoidal shape. Further preferably, the solid particles comprise therein microscopic or meso-scaled pores if they are intended for supercapacitor applications. The pores enable the electrolyte to form high amounts of surface areas where double-layer capacitance charges can be readily developed.

The first binder material is selected from a polymer, polymeric carbon, amorphous carbon, coke, petroleum pitch or heavy oil, coal tar pitch or heavy oil, meso-phase pitch, metal, glass, ceramic, oxide, organic material (particularly, polycyclic, hetero-cyclic, or highly aromatic molecules), or a combination thereof. Preferably, the binder material phase is porous. The first binder material most preferably comprises a carbon material obtained by pyrolyzing or heating a polymer, organic material, coal tar pitch, petroleum pitch, meso-phase pitch, or a combination thereof. Such a heat treatment tends to naturally produce a desirable level of porosity.

The NGPs preferably have a thickness less than 100 nm and a length, width, or diameter less than 10 μm. For supercapacitor applications, NGPs preferably have a thickness less than 10 nm, more preferably less than 2 nm, and most preferably less than 1 nm. For lithium ion battery applications, graphene platelets can have a thickness greater than 100 nm, but preferably less than 100 nm. The length, width, or diameter of NGPs is preferably less than 5 μm (preferably smaller than 2 μm) so that the composite solid particles are typically no greater than 10 μm in diameter (preferably smaller than 5 μm). This will allow for facile migration of lithium ions, enabling a high-rate capacity.

The nano graphene platelets may be obtained from intercalation and exfoliation of a layered or laminar graphite to produce graphite worms composed of exfoliated flakes that are loosely interconnected. The exfoliation is followed by separation of these flakes or platelets. The laminar graphite may be selected from a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon. Natural graphite is particularly desirable due to its abundant availability and low cost.

Another preferred embodiment of the present invention is a composite composition for electrochemical cell electrode applications. This composition comprises multiple solid particles, wherein (a) a solid particle is composed of graphene platelets dispersed in or bonded by a first matrix or binder material; (b) the graphene platelets have a length or width in the range of 10 nm to 10 μm; (c) the multiple solid particles are bonded by a second binder material; and (d) the first or second binder material is selected from a polymer, polymeric carbon, amorphous carbon, coke, petroleum pitch, coal tar pitch, meso-phase pitch, metal, glass, ceramic, oxide, organic material, or a combination thereof.

The present invention also provides a lithium secondary battery comprising an anode, a cathode, a separator disposed between the anode and the cathode, and an electrolyte in contact with the anode and the cathode, wherein the anode comprises the aforementioned composite solid particles as an anode active material.

Another preferred embodiment of the present invention is a supercapacitor comprising two electrodes, a separator disposed between the two electrodes, and an electrolyte in ionic contact with the two electrodes, wherein at least one of the two electrodes comprises the presently invented nanocomposite solid particles as an electrode active material. As opposed to one of our earlier inventions, wherein NGPs and a matrix material were mixed to directly form a plate-like composite electrode, followed by an optional carbonization, we sought to find an even better approach to the preparation of NGP-based supercapacitor electrode materials. After an extensive research effort, we have surprisingly discovered that a composite structure having a much higher level of porosity and, hence, higher specific capacitance could be obtained by (1) first mixing and forming NGP and a first binder material (polymer, petroleum heavy oil, pitch, etc.) into individual nanocomposite solid particles; (2) carbonizing the binder material to produce porous, NGP-carbon nanocomposite particles; and (3) packing and bonding these particles with a second binder material (with or without a subsequent carbonization of this second binder material).

DETAILED DESCRIPTION OF PREFERRED EMBODIMENTS

This invention is related to electrode materials for the supercapacitor and the high-capacity lithium secondary battery, which is preferably a secondary battery based on a non-aqueous electrolyte or a polymer gel electrolyte. The shape of a supercapacitor or a lithium secondary battery can be cylindrical, square, button-like, etc. The present invention is not limited to any battery shape or configuration.

Figure 1A:
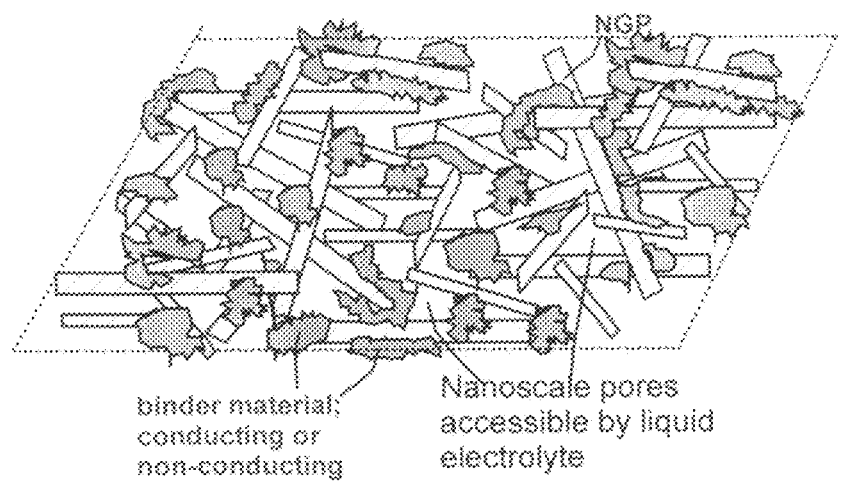
FIG. 1(A) Schematic of a prior art meso-porous NGP nanocomposite [Ref. 40], comprising NGPs bonded by a binder material; and (B) Schematic of a nanocomposite composition according to a preferred embodiment of the present invention.

As schematically shown in FIG. 1(A) [Ref. 40], we have previously invented a meso-porous NGP nanocomposite, comprising NGPs bonded by a binder material, for supercapacitor applications. Nano-scaled graphene platelets were mixed with a binder material to directly form a sheet- or layer-like structure as an electrode of a supercapacitor. In such a configuration, due to sheet-like or thin plate-like geometry of NGPs, special care must be exercised to prevent individual platelets from overlaying one another, which otherwise could reduce the effective specific surface area that is accessible by the electrolyte. Physical entities that are platelet in shape tend to overlay one another to have a close-packing, leaving behind fewer pores or pores of insufficient sizes.

Figure 1B:
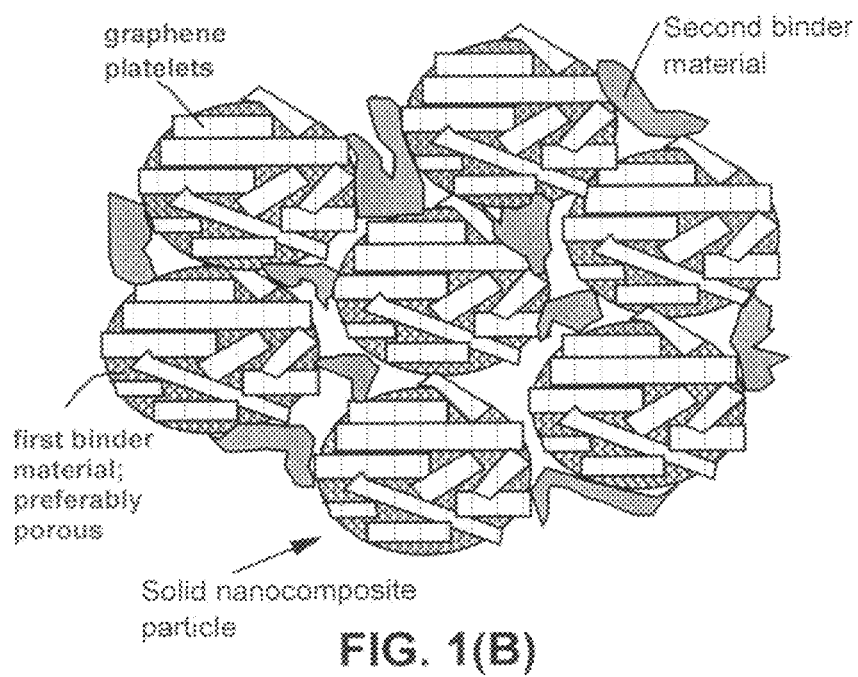

By contrast, in the present invention (e.g., as schematically shown in FIG. 1(B)), the graphene plates and a first binder material (e.g., a resin or a carbon) are combined to form micron-scaled composite particles, hereinafter referred to as nanocomposite solid particles or micro-composites, in which graphene platelets with a length/width/diameter of preferably less than 10 μm and thickness less than 100 nm are bonded by the first binder material to form spherical or ellipsoidal particles. Due to the spherical or ellipsoidal shape, these particles, when packed together, tend to naturally form pores between particles. Further, our processing techniques enable most of the inter-graphene spacings (interstitials) being accessible by lithium ions in a lithium ion battery, or enable most of the NGP surfaces accessible by the electrolyte in a supercapacitor. The later application is made possible by forming pores in the binder phase or at the interfaces between NGPs and the first binder material. The microcomposites (or nanocomposite solid particles) are then bonded together by a second binder material to form an electrode sheet or layer.

Briefly, such microcomposites may be prepared in the following way (as an example): Graphene platelets and a precursor binder material (e.g., a monomer, oligomer, prepolymer, resin, polymer, coal tar pitch, petroleum pitch, meso-phase pitch, etc) may be blended together and suspended in a liquid to form a precursor suspension or dispersion. The liquid may be the monomer itself, a solvent for the resin or polymer, or a suspending medium, such as water, with a primary purpose of preparing a dispersion. The suspension may then be aerosolized or atomized to form fine aerosol particles. Concurrently or subsequently, the liquid is removed to form solid particles that are typically spherical in shape (with a diameter less than 10 μm) or ellipsoidal in shape (with a major axis less than 10 μm). This procedure may be accomplished by using an aerosol generation, atomization, spray drying, or inkjet printing technique. As an optional but preferred procedure, the solid particles are simultaneously or subsequently subjected to a pyrolyzation (pyrolysis) or carbonization treatment to convert the organic or polymeric first binder material into a carbon material possibly with concomitant formation of pores. These pores are formed due to the non-carbon elements being removed from the thermally degraded or carbonized organic or polymeric material. Essentially, one can use a spray pyrolysis technique, such as ultrasonic spray pyrolysis or electro-spray pyrolysis, to accomplish both the aerosol generation and pyrolysis procedures.

Hence, the present invention provides a graphene platelet nanocomposite composition for electrochemical cell electrode applications. The composition comprises solid particles of nano-scaled graphene platelets dispersed in or bonded by a first binder material. The graphene platelets occupy a weight fraction of 2% to 98% of the total nanocomposite weight. Preferably, the nanocomposite solid particles are substantially spherical or ellipsoidal in shape. Further preferably, the solid particles comprise therein meso-scaled pores (preferably 1-10 nm). These pores are sufficient in sizes to enable transport of ions in a secondary battery; e.g., allowing the lithium ions to move in and out of the pores in a lithium ion battery. It may be noted that although the presence of these pores may be advantageous, they are not necessarily required for lithium ion battery anodes and the pores can be reduced or eliminated with proper heat treatment conditions if so desired. For supercapacitor electrode applications, it is advantageous and necessary to have the pores that allow the electrolyte to form high amounts of surface areas where double-layer capacitance charges can be developed.

The first binder material is selected from a polymer, polymeric carbon, amorphous carbon, coal tar pitch or heavy oil, petroleum pitch or heavy oil, meso-phase pitch, metal, glass, ceramic, oxide, organic material, or a combination thereof. Preferably, the binder material phase is porous if used for a supercapacitor. The first binder material most preferably comprises a carbon material obtained by pyrolyzing or heating a polymer, organic material (e.g., polynuclear or heterocyclic aromatic molecules), coal tar pitch, petroleum pitch, meso-phase pitch, or a combination thereof.

The NGPs preferably have a thickness less than 100 nm and a length, width, or diameter less than 10 μm. For supercapacitor applications, NGPs preferably have a thickness less than 10 nm, more preferably less than 2 nm, and most preferably less than 1 nm. For lithium ion battery applications, graphene platelets can have a thickness greater than 100 nm, but preferably less than 100 nm. The length, width, or diameter of NGPs is preferably less than 5 μm so that the nanocomposite solid particles are typically no greater than 10 μm in diameter, and preferably smaller than 5 μm. This will allow for facile migration of lithium ions.

Figure 2:
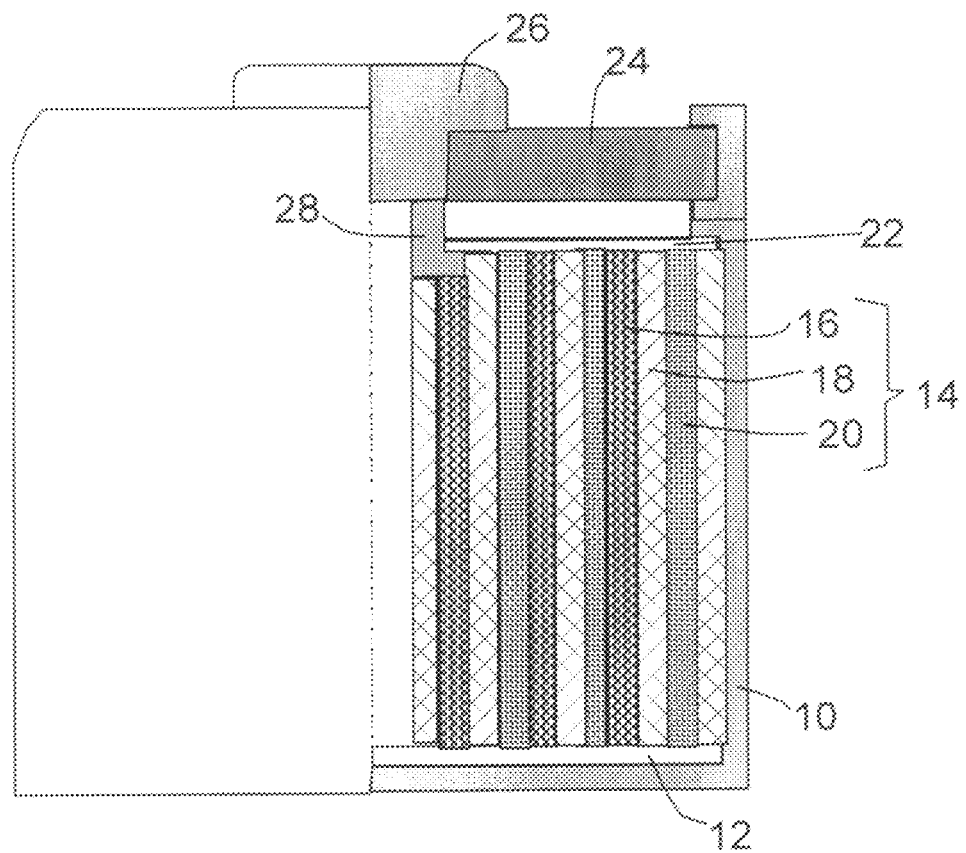
FIG. 2 Schematic of a cylinder-shape lithium ion battery.

As an example, a cylindrical battery configuration is shown in FIG. 2. A cylindrical case 10 made of stainless steel has, at the bottom thereof, an insulating body 12. An assembly 14 of electrodes is housed in the cylindrical case 10 such that a strip-like laminate body, comprising a positive electrode 16, a separator 18, and a negative electrode 20 stacked in this order, is spirally wound with a separator being disposed at the outermost side of the electrode assembly 14. The cylindrical case 10 is filled with an electrolyte. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

The positive electrode (cathode) active materials are well-known in the art. The positive electrode 16 can be manufactured by the steps of (a) mixing a positive electrode active material with a conductor agent (conductivity-promoting ingredient) and a binder, (b) dispersing the resultant mixture in a suitable solvent, (c) coating the resulting suspension on a collector, and (d) removing the solvent from the suspension to form a thin plate-like electrode. The positive electrode active material may be selected from a wide variety of lithium-containing oxides, such as lithium manganese oxide, lithium-containing nickel oxide, lithium-containing cobalt oxide, lithium-containing nickel cobalt oxide, lithium-containing iron oxide, lithium-containing vanadium oxide, lithium iron phosphate, etc. The positive electrode active material may also be selected from chalcogen compounds, such as titanium disulfate or molybdenum disulfate. More preferred are lithium cobalt oxide (e.g., $Li_xCoO_2$ where $0.8 \le x \le 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost.

Acetylene black, carbon black, or ultra-fine graphite particles may be used as a conductor agent. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 80 to 95% by weight for the positive electrode active material, 3 to 20% by weight for the conductor agent, and 2 to 7% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a synthetic resin nonwoven fabric, porous polyethylene film, porous polypropylene film, or porous PTFE film.

The negative electrode (anode), which the instant invention provides, is now explained in detail as follows: Carbon materials can assume an essentially amorphous structure (glassy carbon), a highly organized crystal (graphite crystal or crystallite), or a whole range of intermediate structures that are characterized by having various proportions and sizes of graphite crystallites and defects dispersed in an amorphous carbon matrix. Typically, a graphite crystallite is composed of a number of graphene sheets or basal planes (also referred to as a-b planes) that are bonded together through van der Waals forces in the c-axis direction, the direction perpendicular to the basal plane. These graphite crystallites are typically micron- or nanometer-sized in the a- or b-direction (these are called La dimension). The c-directional dimension (or thickness) is commonly referred to as Lc. The interplanar spacing of a perfect graphite is known to be approximately 0.335 nm (3.35 Å). The graphite crystallites are dispersed in or connected by crystal defects or an amorphous phase in a graphite particle, which can be a graphite flake, carbon/graphite fiber segment, carbon/graphite whisker, or carbon/graphite nanofiber. In the case of a carbon or graphite fiber segment, the graphene plates may be a part of a characteristic "turbostratic" structure.

According to a preferred embodiment of the present invention, the anode comprises nanocomposite solid particles, wherein a solid particle is composed of nano-scaled graphene platelets (NGPs) dispersed in, or bonded by, a first matrix or binder material. The NGPs are pre-fabricated using an inexpensive process [e.g., as explained in Refs. 32-40] from an inexpensive starting material, such as natural graphite. For instance, NGPs can be prepared by the following steps: (a) immersing natural graphite particles in a mixture of sulfuric acid, sodium nitrate, and potassium permanganate at 30° C. to obtain a graphite intercalation compound (GIC); (b) exposing the GIC to a high temperature (e.g. 600-1,100° C.) for a period of 30 seconds to 2 minutes to produce exfoliated graphite; and (c) optionally subjecting the exfoliated graphite to a graphene sheet separation treatment, such as air jet milling, ball milling, rotating-blade shearing, or ultrasonication. In many cases (with adequate intercalation time and sufficient exfoliation temperature), the exfoliated graphite already comprises many fully separated nano graphene platelets and, hence, step (c) is not necessary. It may be noted that these NGPs could comprise a wide spectrum of graphite-based nano sheets or platelets, including from relatively oxygen-free, pristine graphene sheets to highly oxidized graphene sheets that are essentially graphite oxide (GO) nano platelets, depending upon the actual NGP process conditions used.

A selected amount of NGPs are then mixed with a precursor matrix or binder material selected from a monomer, pre-polymer, polymer, aromatic organic (e.g., polycyclic aromatic molecules such as naphthalene, anthracene, and phenanthrene), petroleum-based heavy oil or pitch, coal-based heavy oil or pitch, meso-phase pitch (e.g., obtained by heat-treating coal tar pitch at 400° C. for a desired period of time), or a combination thereof. This precursor matrix can be a liquid at room temperature, or heated to an elevated temperature (typically lower than 300° C.) to become a liquid. Alternatively, a solvent may be used to dissolve this precursor matrix/binder material to form a solution. The liquid or solution state facilitates its mixing with NGPs to form a suspension or dispersion.

The resulting suspension can be converted into micron-scaled droplets (microcomposites or nanocomposite solid particles) using several approaches. For instance, the suspension may be aerosolized or atomized to form fine aerosol particles. Concurrently or subsequently, the liquid or solvent is removed to form solid particles that are typically spherical or ellipsoidal in shape with a diameter or major axis less than 10 μm and, in most cases, less than 5 μm if the NGP lateral dimensions are mostly less than 2 μm. This procedure may be executed by using an aerosol generation, atomization, spray drying, or inkjet printing apparatus, which apparatus is well-known in the art. As an optional but preferred procedure, the solid particles are simultaneously or subsequently subjected to a pyrolysis or carbonization treatment to convert the organic or polymeric first binder material into a carbon material possibly with concomitant formation of pores. These pores are formed due to the non-carbon elements being removed from the thermally degraded or carbonized organic or polymeric material. The heat treatment of petroleum or coal-based heavy oil or pitch will serve to convert at least part of the oil or pitch into a meso-phase, an optically anisotropic or liquid crystalline phase of a fused aromatic ring structure. The converted pitch is called a meso-phase pitch. Since NGPs are essentially pure graphite or graphene materials, this low temperature heat treatment (350-1,200° C.) has no effect on the NGP structure. Essentially, one can use a spray pyrolysis technique, such as ultrasonic spray pyrolysis or electro-spray pyrolysis, to accomplish both the aerosol generation and pyrolysis procedures.

The NGP-precursor suspension may also be converted into nanocomposite solid particles using combined extrusion, pelletization (granulation), and grinding (including ball milling). Surprisingly, a large proportion of NGPs can be incorporated into a matrix to form a nanocomposite mixture that is highly flowable (fluid-like) even with an NGP loading as high as 75% by weight in most of the aforementioned precursor binder/matrix materials. This is likely due to their two-dimensional, platelet shape, enabling NGPs to readily slide over one another in a liquid medium. Hence, an NGP-containing suspension can be extruded into filaments, which are cut into small granules that are millimeter in size. These granules are then further reduced in size using grinding or ball milling. The resulting micron-scale particles are not necessarily spherical in shape, but still can be easily bonded by a second binder material.

The second binder material may also be selected from a polymer, polymeric carbon, amorphous carbon, coal tar pitch or heavy oil, petroleum pitch or heavy oil, meso-phase pitch, metal, glass, ceramic, oxide, organic material, or a combination thereof. In one preferred embodiment, the binder may be chosen from polytetrafluoroethylene (PTFE), polyvinylidene fluoride (PVDF), ethylene-propylene-diene copolymer (EPDM), or styrene-butadiene rubber (SBR), for example, as in the cases of conventional MCMB- or graphite-based anodes. Preferably, the second binder material may be a conducting polymer, such as polyacetylene, polypyrrole, polyaniline, polythiophene, and their derivatives. For supercapacitor applications, the first binder material may also be a conducting polymer. Alternatively, the second binder material may be initially a polymer, coal tar pitch or heavy oil, petroleum pitch or heavy oil, and polycyclic aromatic molecules and, after bonding nanocomposite solid particles, may be heat-treated to become a polymeric carbon, amorphous carbon, or meso-phase pitch. This step provides another opportunity to reduce the internal electrical resistance and generate additional pores, if so desired (e.g., for supercapacitor electrodes).

It may be noted that this new class of nanocomposite solid particles is fundamentally different from MCMBs although the latter contain graphene sheets as well (these graphene crystallites were nucleated and grown directly from the meso-phase matrix during graphitization). MCMBs are typically produced by (a) heating and carbonizing selected heavy oil or pitch to form meso-phase micro-spheres dispersed in an isotropic matrix pitch; (b) separating the meso-phase micro-spheres from the isotropic pitch; and (c) graphitizing the isolated meso-phase micro-spheres (this latter step being tedious and energy-intensive). The presently invented nanocomposite solid particles are not obtained by graphitizing the precursor binder or matrix material, as opposed to the case of conventional MCMB productions. This is a non-obvious advantage since the present nanocomposite composition exhibits surprisingly high reversible anode capacity, much higher than that of state-of-the-art MCMBs. Furthermore, NGPs used in the present invention can come from natural graphite that is already highly graphitized. One only needs to disperse NGPs in a carbonaceous matrix. No graphitization at a high temperature (>2,500° C.) is required. The presently invented nanocomposite solid particles and their anode structures can be very inexpensive.

Preferably, the nanocomposite solid particles are substantially of spherical or ellipsoidal shape. Further preferably, the solid particles comprise therein microscopic or meso-scaled pores if they are intended for supercapacitor applications. For these applications, the nanocomposite solid particles, before and/or after being bonded with the second binder material, may be further subjected to an activation treatment; e.g., by exposing the material to a mixture of water steam and carbon dioxide, or a KOH or NaOH solution. This activation treatment can significantly, often dramatically, increase the amount of pores as indicated by an increase in specific surface area. The pores enable the electrolyte to form high amounts of surface areas where double-layer capacitance charges can be developed.

In one preferred embodiment, the NGPs may be derived from natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or polymeric carbon. For instance, natural flake graphite may be subjected to a deep oxidation treatment under a condition comparable to what has been commonly employed to prepare the so-called expandable graphite or stable graphite intercalation compound, but with a higher degree of oxidation. This can be accomplished by immersing graphite powder in a solution of sulfuric acid, nitric acid or nitrate, and potassium permanganate for preferably 1-24 hours. The resulting acid-intercalated graphite compound is then subjected to vigorous washing and rinsing to remove essentially all the intercalants. The subsequently dried product is a heavily oxidized graphite powder, which comprises graphite oxide. Powder X-ray diffraction indicates that the interplanar spacing is typically between 0.55 and 0.75 nm. These expanded interplanar spacings are characteristic of graphite oxide (GO). When exposed to a thermal shock at a temperature of 1,000 C or higher, the GO was exfoliated to a great extent to obtain NGPs that contain mostly GO nano platelets.

Although not required, the first binder material (e.g., mesophase pitch, graphitic coke, or polymeric carbon) may be subjected to additional graphitization treatment at a temperature in the range of 1,500 to 3,000° C. to form additional nano- or micro-crystallites dispersed in an amorphous carbon matrix.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

Although the above discussion of the preferred embodiments of the present invention was more for lithium ion battery anode application, the same nanocomposite solid particles and composite structures comprising multiple nanocomposite solid particles bonded by a second binder material can be used for supercapacitor applications. The only main difference is that a supercapacitor electrode material demands a high amount of pores (preferably with a pore size >1 or 2 nm) that are accessible by liquid electrolyte. Hence, the first binder/matrix material and/or the second binder material are preferably porous.

Hence, a particularly preferred embodiment of the present invention includes a substantially spherical or spheroidal-shape, meso-porous, nanocomposite solid particle, which is composed of NGPs bonded by a first binder material. Another preferred embodiment of the present invention is an electrode comprising multiple nanocomposite solid particles bonded by a second binder material. A further preferred embodiment is a supercapacitor comprising such an electrode. The first and second binder materials are chosen and processed in such a manner that the nanocomposite solid particles, with or without a second binder material, have a specific surface area greater than about 100 $m^2/gm$, preferably greater than 500 $m^2/gm$, more preferably greater than 1,000 $m^2/gm$, and most preferably greater than 1,500 $m^2/gm$.

The binder material not only helps to hold the NGPs together in an electrode, but also can impart additional surface areas and/or pseudo-capacitance to the supercapacitor. The binder or matrix material preferably is electrically conducting. The conductive binder or matrix material may be selected from the group consisting of a conducting polymer, a polymeric carbon, an amorphous carbon, a petroleum pitch or its derivative, a coal tar pitch or its derivative, and combinations thereof. The conducting material preferably comprises a conjugate chain polymer such as polypyrrole, polyaniline, and polythiophene. The NGPs alone or NGP-matrix/binder composite materials may be subjected to surface treatments such as $CO_2$ activation, transition metal oxide or sulfide coating, and/or conjugate chain polymer coating to obtain pseudo-capacitance effects. A polymer, coal tar pitch, or petroleum pitch matrix can be further pyrolized or carbonized to increase specific surface area and electrical conductivity of the nanocomposite.

The following examples serve to illustrate the best mode practice of the present invention and should not be construed as limiting the scope of the invention, which is defined in the claims.

EXAMPLE 1

Preparation of NGPs of Various Sizes from Natural Graphite and Production of Corresponding Nanocomposite Solid Particles Natural flake graphite, nominally sized at 45 μm, provided by Asbury Carbons (405 Old Main St., Asbury, N.J. 08802, USA) was milled to reduce the size to approximately 14 μm (Sample 1a). The chemicals used in the present study, including fuming nitric acid (>90%), sulfuric acid (95-98%), potassium chlorate (98%), and hydrochloric acid (37%), were purchased from Sigma-Aldrich and used as received. Graphite intercalation compounds (GICs), which were actually highly oxidized graphite or graphite oxide (GO) samples, were prepared according to the following procedure:

Sample 1A: A reaction flask containing a magnetic stir bar was charged with sulfuric acid (1.76 L) and nitric acid (0.90 L) and cooled by immersion in an ice bath. The acid mixture was stirred and allowed to cool for 20 min, and graphite (100 g) was added under vigorous stirring to avoid agglomeration. After the graphite powder was well dispersed, potassium chlorate (800 g) was added slowly over 25 min to avoid sudden increases in temperature. The reaction flask was loosely capped to allow evolution of gas from the reaction mixture, which was stirred for 24 hours at room temperature. On completion of the reaction, the mixture was poured into 40 L of deionized water and filtered. The GO was re-dispersed and washed in a 5% solution of HCl to remove sulphate ions. The filtrate was tested intermittently with barium chloride to determine if sulphate ions are present. The HCl washing step was repeated until this test was negative. The GO was then washed repeatedly with deionized water until the pH of the filtrate was neutral. The GO slurry was spray-dried and stored in a vacuum oven at 60° C. until use.

Sample 1B: The same procedure as in Sample 1A was followed, but the reaction time was 48 hours.

Sample 1C: The same procedure as in Sample 1A was followed, but the reaction time was 96 hours.

Figure 3:
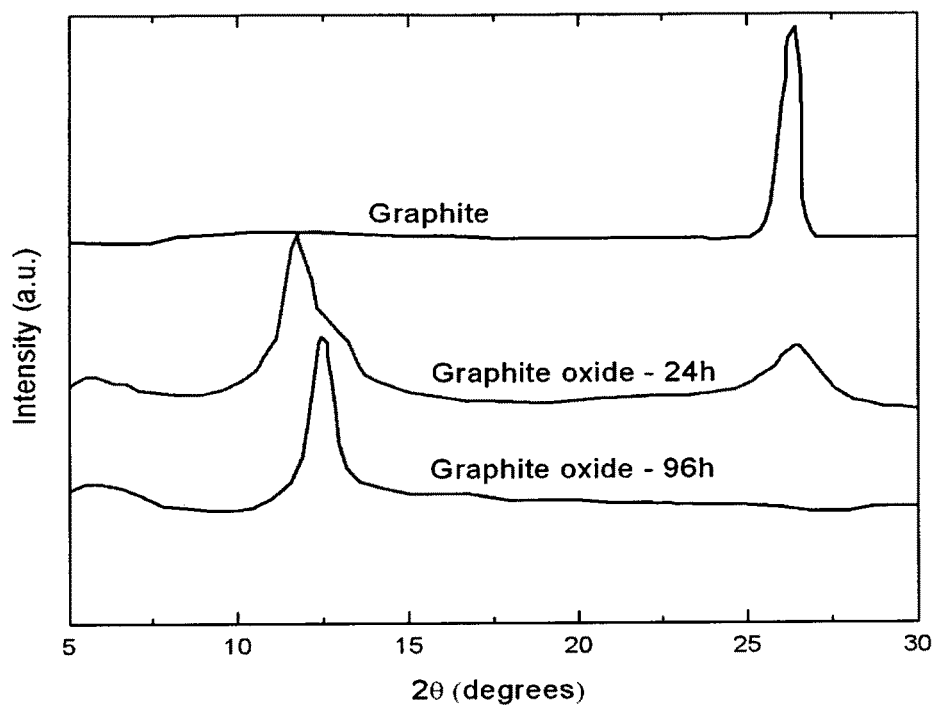
FIG. 3 X-ray diffraction peaks of natural graphite particles after intercalation/oxidation treatments for three different lengths of time. The sample with the longest treatment time exhibits an expanded interplanar spacing characteristic of graphite oxide while the corresponding peaks for natural graphite (with $d_{002}$=0.335 nm) essentially vanished.

X-ray diffraction studies (FIG. 3) showed that after a treatment of 24 hours, a significant proportion of graphite has been transformed into graphite oxide. The peak at $2\theta=26.3°$, corresponding to an interplanar spacing of 0.335 nm (3.35 Å) for pristine natural graphite (top curve in FIG. 2), was significantly reduced in intensity (middle curve) after a deep oxidation treatment for 24 hours. The curves for treatment times of 48 and 96 hours are essentially identical (bottom curve), showing that essentially all of the graphite crystals have been converted into graphite oxide with an interplanar spacing of 6.5-7.5 Å (the 26.3° peak has totally disappeared).

Approximately 50 grams of Sample 1A (GICs) were exposed to a thermal shock at 900° C. for 45 seconds in a quartz tube filled with nitrogen gas to obtain an exfoliated graphite sample. Several batches of this exfoliated graphite, each of approximately 5 grams, were dispersed in water to form suspensions, which were ultrasonicated at a power level of 75 watts for several different periods of times: 2 minutes, 10 minutes, 30 minutes, 2 hours, and 24 hours. The resulting NGPs were separately spray-dried with their average dimensions measured by using a combination of scanning electron microscopy (SEM), transmission electron microscopy (TEM), atomic force microscopy (AFM), and specific surface area measurements using a BET apparatus.

Figure 4:
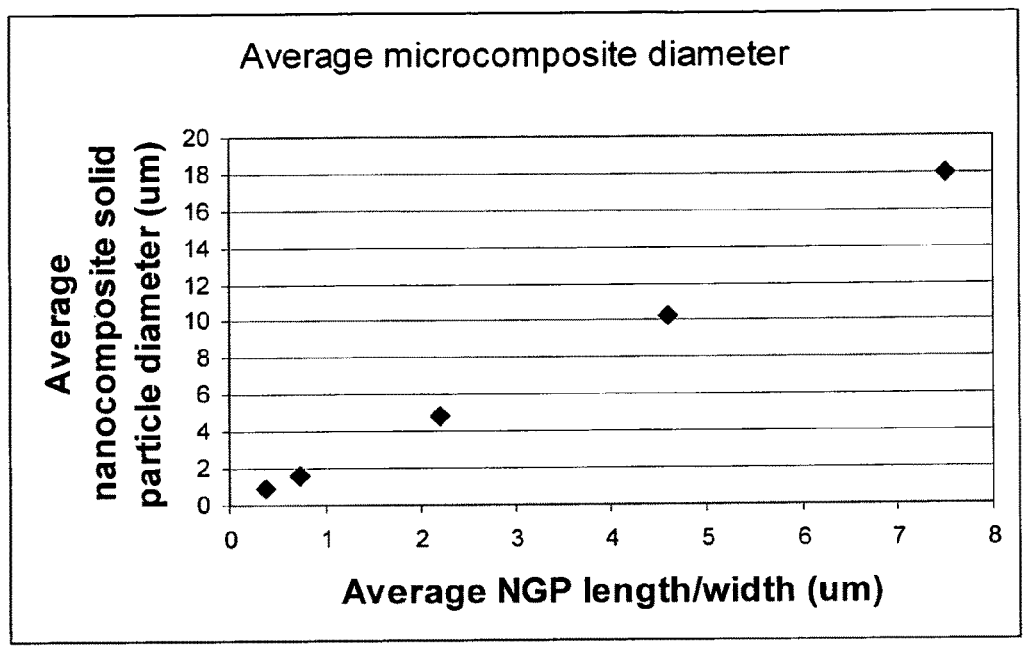
FIG. 4 The lateral dimensions (average length and width) of NGPs appear to dictate the diameters of the NGP-matrix nanocomposite solid particles after atomization or spray-drying.

This series of dried powder samples were then separately mixed with a petroleum pitch (A240 from Ashland Oil) and benzene (as a solvent or diluent) to form separate composite suspensions. These suspensions were fed into a laboratory scale spray drier equipped with an atomizer head. This procedure produced relatively spherical microcomposites (nanocomposite solid particles) with a relatively narrow particle size distribution. Each solid particle was composed of a number of NGPs dispersed in a pitch matrix. The average solid particle size from each suspension was measured and the data was plotted as a function of the corresponding NGP lateral dimension (length or width) in FIG. 4. This diagram indicates that the nanocomposite solid particle diameter scales with the constituent NGP length/width and that we could readily produce nanocomposite solid particles smaller than 5 μm in diameter. Particles less than 1 μm in diameter were also readily achievable. This is in sharp contrast to the commercially available MCMBs that have been limited to particle sizes greater than 5 μm in diameter. Smaller anode active material particles are particularly amenable to fast battery charge and discharge operations, leading to high-rate capacity batteries.

EXAMPLE 2

NGPs and Their Nanocomposite Solid Particles from Other Laminar Graphite Materials NGPs of Samples 2A, 2B, 2C, and 2D were prepared according to the same procedure used for Sample 1B, but the starting graphite materials were highly oriented pyrolytic graphite (HOPG, from Advanced Ceramics, Inc., Cleveland, Ohio), graphite fiber (Amoco P-100), graphitic carbon nanofiber (from Applied Sciences, Inc., Cedarville, Ohio), and spheroidal graphite (from Hua Dong Graphite Co., Pingdu, China), respectively. Their final interplanar spacings are 6.6 Å, 7.3 Å, 7.3 Å, and 6.6 Å, respectively. They were exposed to an exfoliation temperature at 950° C. for 45 seconds, followed by a mechanical shearing treatment using a Cowles rotating-blade apparatus for 30 minutes. They were separately mixed with a phenolic resin, extruded into small diameter filaments (3 mm diameter) using a simple plunger-type device, cured at 200° C. for 2 hours, carbonized at 700° C. for 1 hour, chopped into small particles, and then ball-milled for 24 hours. The resulting milled particles are generally irregular in shape with a dimension typically smaller than 3 μm.

EXAMPLE 3

Electrochemical Behavior of NGP Nanocomposite Solid Particles

Graphite intercalation compound was prepared by intercalation/oxidation of natural graphite flakes (original size of 200 mesh, from Huadong Graphite Co., Pingdu, China, milled to approximately 15 µm, referred to as Sample 3a) with sulfuric acid, sodium nitrate, and potassium permanganate according to the method of Hummers [U.S. Pat. No. 2,798, 878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The dried sample was then exfoliated at 1,000 C for 45 seconds in a quartz tube filled with nitrogen.

A series of samples featuring nanocomposite solid particles of NGPs bonded by polymeric carbon were prepared by mixing NGPs with a phenol resin to obtain a mixture comprising 10%, 20%, 30%, 40%, 50%, 60%, 70%, 80%, and 90% by weight of phenol resin in each case. Acetone was used to reduce the mixture viscosity initially, but was later removed prior to resin curing. The mixtures were cured at 200° C. for one hour and then carbonized in an argon atmosphere at a temperature of 500° C. for 1 hour, followed by 1,000° C. for 1 hour. Then, the carbonized product was ground and milled to obtain particles of typically smaller than 3 µm in size. After carbonization, the carbon matrix content became 5.8%, 12.1%, 16.8%, 24.2%, 31.3%, 36.1%, 40.6%, 49.7%, and 55.8%, respectively.

The electrochemical properties of these nanocomposite solid particles were evaluated under an argon atmosphere by both cyclic voltammetry and galvanostatic cycling in a three-electrode configuration, with the composite-copper substrate as the working electrode and Li foil as both the reference and counter-electrodes. A second binder material (SBR) was used to bond the nanocomposite solid particles to form a porous composite and to bond the composite to the copper foil, which serves as a current collector. Charge capacities were measured periodically and recorded as a function of the number of cycles. The charge capacity herein referred to is the total charge inserted into the composite, per unit mass of the composite (counting all NGP and binder/matrix weights), during Li insertion, whereas the discharge capacity is the total charge removed during Li extraction. The morphological or microstructural changes of selected samples after a desired number of repeated charging and recharging cycles were observed using both transmission electron microscopy (TEM) and scanning electron microscopy (SEM).

Figure 5A:
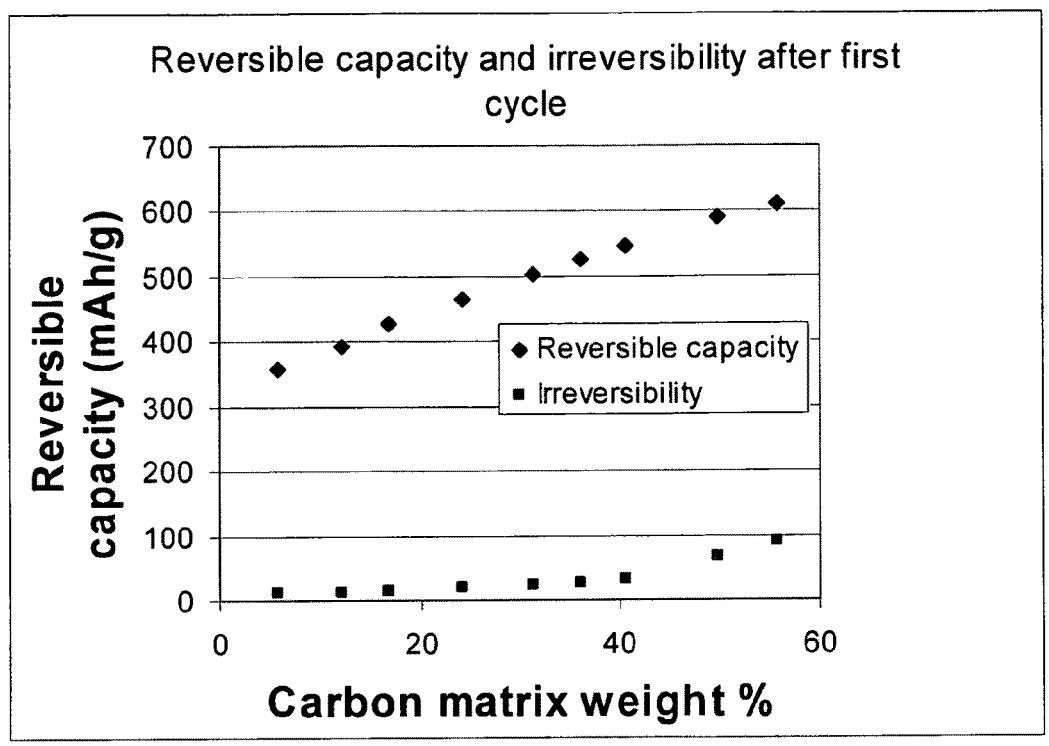
FIG. 5(A) Reversible and irreversible capacities of the presently invented nanocomposite-based electrodes are plotted versus the carbon matrix weight fraction; (B) The percentage of irreversibility plotted over the carbon matrix weight fraction.
Figure 5B:
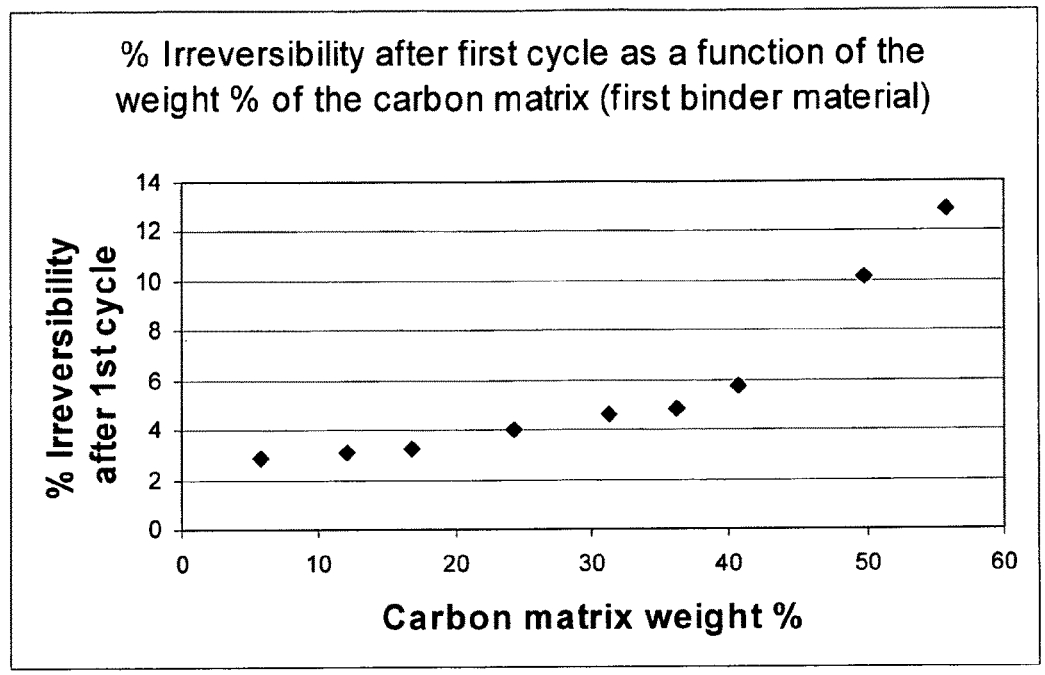

The reversible and irreversible capacities of the presently invented nanocomposite-based electrodes after first cycle are plotted versus the carbon matrix weight fraction in FIG. 5(A). The percentage of irreversibility is plotted in FIG. 5(B). These data demonstrate that the reversible capacities for most of the presently invented NGP-containing nanocomposites exceed the theoretical capacity (372 mAh/g) for graphite and that the irreversibility has been minimal. These are highly surprising, yet highly desirable results.

Although conventional amorphous carbon materials, including both soft carbon and hard carbon, exhibit a relatively high capacity (500-800 mAh/g), they have a relatively low electrical conductivity, typically lower than $10^{-3}$ S/cm (high charge transfer resistance), and, hence, resulting in a high polarization or internal power loss. In contrast, the present NGP-carbon composites exhibit a conductivity value in the range of $2.2 \times 10^1$ S/cm and $8.5 \times 10^2$ S/cm. Furthermore, conventional amorphous carbon-based anode materials tend to give rise to a high irreversible capacity, typically much greater than 20% even just after first charge-discharge cycle. One possible explanation for this shortcoming was the notion that many of the structural defects seemed to become detrimental sites for trapping lithium atoms/ions, which no longer participate in the insertion and extraction operations during subsequent charge-discharge cycling. By contrast, in the presently invented nanocomposite solid particles, the co-existence of a matrix carbon and NGPs appears to provide a synergistic effect for inserting and extracting Li ions. Less than 10% irreversibility in capacity was observed for all nanocomposites containing less than 50% by weight amorphous carbon matrix.

Furthermore, all the commercially available MCMBs, containing essentially all ordered graphite crystallites with very little amorphous carbon content, provide a capacity of less than 350 mAh/g.

EXAMPLE 4

NGPs and Nanocomposites From MCMBs

Graphite intercalation compound was prepared by intercalation/oxidation of meso-carbon micro-beads (MCMBs) according to the same procedure used in Example 3. MCMB 2528 microbeads (Sample 4a) were supplied by Alumina Trading, which is the U.S. distributor for the supplier, Osaka Gas Company of Japan. This material has a density of about 2.24 g/cm$^3$; a particle size maximum for at least 95% by weight of the particles of 37 microns; median size of about 22.5 microns and an interplanar distance of about 0.336 nm. After deep oxidation treatment, the interplanar spacing in the resulting graphite oxide micro-beads is approximately 0.76 nm. By exposing the intercalated MCMBs to 800° C. for 45 seconds we obtained a large number of small graphene sheets with an average thickness smaller than 1 nm. They appear to be mostly single-layer or double-layer graphene platelets with a lateral dimension of 0.3-0.5 µm. These NGPs were re-dispersed in naphthalene, a major ingredient in isotropic pitch. Since NGPs are well-developed graphite crystallites or graphene sheets, they no longer are soluble in pitch or naphthalene and, more importantly, they do not coalesce to form larger sheets or platelets when dispersed in naphthalene or pitch. This feature enables us to obtain nanocomposite solid particles that are approximately 1 µm in diameter, which are not achievable with the original MCMBs. We have determined that it would only add additional 2 US dollars to convert one kilogram of MCMBs (currently sold at a price of US$20-40/kg) to NGPs. Since a nanocomposite solid particle could contain less than 50% by weight of NGPs and isotropic pitch is very inexpensive (<$0.50/kg), the resulting nanocomposite would be less expensive than MCMBs. Yet, they have proven to perform better as an anode material than MCMBs. This is again an unexpected, but useful result.

EXAMPLE 5

Poly(3-methyl-thiophene)-Bonded NGP Nanocomposites

Electronically conductive polymers by themselves are promising supercapacitor electrode materials because the charge process involves the entire polymer mass and they provide low equivalent series resistance for the electrode. When combined with an NGP-type material, the conducting polymer can impart pseudo-capacitance to the electrode. One desirable conductive polymer selected was poly(3-methyl-thiophene) (pMeT), particularly its p-doped variant. Poly(3-methyl-thiophene) could be synthesized by oxidative chemical polymerization technique using ferric chloride as a dopant in an inert atmosphere.

However, we chose to prepare PMeT doped with different anions electrochemically in the presence of tetra-alkyl-ammonium salts using an NGP mat as an electrode. Once electro-deposition or polymerization was accomplished, the mat was chopped into small pieces and milled into finer particles, 2-7 μm in size. The resulting particles were re-packed (compressed) into sheet-like electrodes by using a second binder material, which is a lower molecular weight version of PMeT.

The specific capacitance of an NGP mat (average NGP thickness=5.2 nm, length=490 nm, and width=490 nm) with no further treatment, when evaluated in 1 M $H_2SO_4$ as electrolyte, was found to be 38 F/g. The nanocomposite particles with NGPs bonded by pMeT exhibited a capacitance of 128 F/g. It may be noted that this specific capacitance value was obtained from non-optimized samples. This was achieved with low-cost NGPs, as opposed to expensive CNT-based materials. A multi-wall CNT/poly(3,4-ethylenedioxythiophene) composite, prepared by chemical or electrochemical polymerization, when evaluated in 1 M $H_2SO_4$, 6 M KOH, or 1 M tetraethylammonium tetrafluoroborate (TEABF4) in acetonitrile, exhibited capacitance values of 60 to 160 F/g. However, CNT materials are much more expensive.

EXAMPLE 6

NGP-Carbon Black (CB) Nanocomposite Particles further Bonded with a Teflon Binder The NGPs used were obtained by exposing Sample 1C (highly oxidized graphite) to a temperature of 1,050° C. for 45 seconds in a nitrogen atmosphere. Carbon black (Black Pearls 2000 from Cabot) and NGPs (at a ratio of 5:5, 8:2, and 10:0 (pure carbon black)) were mixed and dispersed in naphthalene at 120° C. The mixture was spray-dried to form microcomposite particles containing both NGPs and CB bonded by naphthalene, which was then carbonized at 450° C.

The carbon black-NGP-carbon matrix particles were poured into a Teflon particle suspension and thoroughly stirred. The resulting sludge was dried to a dough and rolled into a Nickel net to form an electrode of 0.2 mm thickness, which was sintered at 320° C. under a pressure of 4 kg/cm². The electrolyte used was 1 M tetra-ethyl-ammonium tetrafluoroborate ($TEABF_4$) in acetonitrile. The specific capacitance values of these three samples were 128, 98, and 70 F/g, respectively.

Furthermore, the sample with the CB/NGP ratio of 5:5 exhibits an electrical conductivity greater than 100 S/cm while the pure CB sample (10:0 ratio) has a conductivity lower than 0.1 S/cm. This implies that the NGP can dramatically reduce the equivalent series resistance of a carbon black or activated carbon-based supercapacitor electrode material. This is an important feature for a good electrode material since a lower resistance could lead to a lower energy loss and faster capacitor response. The maximum power density of a supercapacitor is given by $P_{max}=V_i^2/(4R)$, where $V_i$ is the initial voltage and R the equivalent series resistance (ESR). A lower ESR means a higher power density. Due to their high length-to-thickness and width-to-thickness ratios, NGPs could easily overlap each other to form a continuous electron path for enhanced conductivity. Other fillers that can be incorporated in the nanocomposite include segments of graphitic nano-fiber, carbon nanotube, carbon fiber, nano-scaled metal, nano-scaled metal oxide, and combinations thereof.

EXAMPLE 7

NGP-Carbon Matrix Microcomposites

The performance of supercapacitor electrodes based on NGP-carbon nanocomposite particles derived from polyacrylonitrile (PAN) matrix was investigated. An NGP/PAN dispersion was prepared at room temperature by mixing NGPs (prepared from Sample 1C with an exfoliation temperature of 1,050° C.) with a 1.5 g/l dimethylformamide (DMF) solution of poly(acrylonitrile-methyl acrylate) (90:10) (PAN copolymer with Mw=approximately 100,000 g/mol from Aldrich). The weight ratio of NGP to PAN copolymer was 4:6.

Atomization (using a spray dryer) of the suspension at 85-100° C. resulted in nanocomposite particles with a diameter of 2-10 μm. These particles were heat treated at 300° C. for 1 hour, while being tumbled in a container to avoid agglomeration, and then at 700° C. in an argon atmosphere for 30 minutes to obtain NGP-carbon matrix nanocomposite particles (Sample 7-A).

Figure 6:
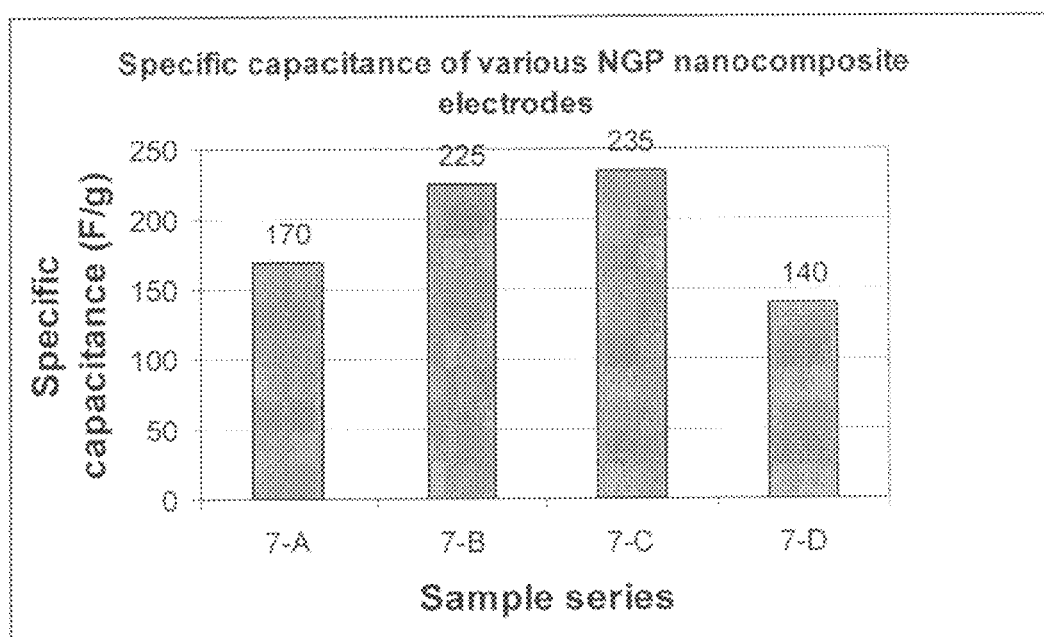
FIG. 6 The specific capacitance of supercapacitor electrodes based on NGP nanocomposite solid particles after different treatments: carbonization, activation, and/or surface coating.

A selected amount of these particles were subsequently activated in $CO_2$ at 700° C. for 20 minutes in a tube furnace to obtain Sample 7-B. Some of Sample 7-A material was electro-chemically deposited with a thin layer of polypyrrole (PPy) to obtain Sample 7-C. The data shown in FIG. 6 demonstrate that both surface activation and conductive polymer coating are very effective in further enhancing the specific capacitance of NGP-containing nanocomposite particles. Impressive supercapacitance values (e.g., >200 F/g) are readily achievable with the presently invented meso-porous nanocomposites.

For the purpose of comparing with the supercapacitance of a prior art nanocomposite, Sample 7-D was prepared according to a prior art approach [40], which entailed mixing NGPs with PAN to directly form a composite in a plate-like structure and then carbonizing the PAN matrix of this composite plate. By contrast, in the presently invented composite case, NGPs were mixed with PAN first to form spherical nanocomposite solid particles (e.g., via atomization), followed by packing and bonding these particles with a second binder material to form a plate-like electrode.

Figure 7:
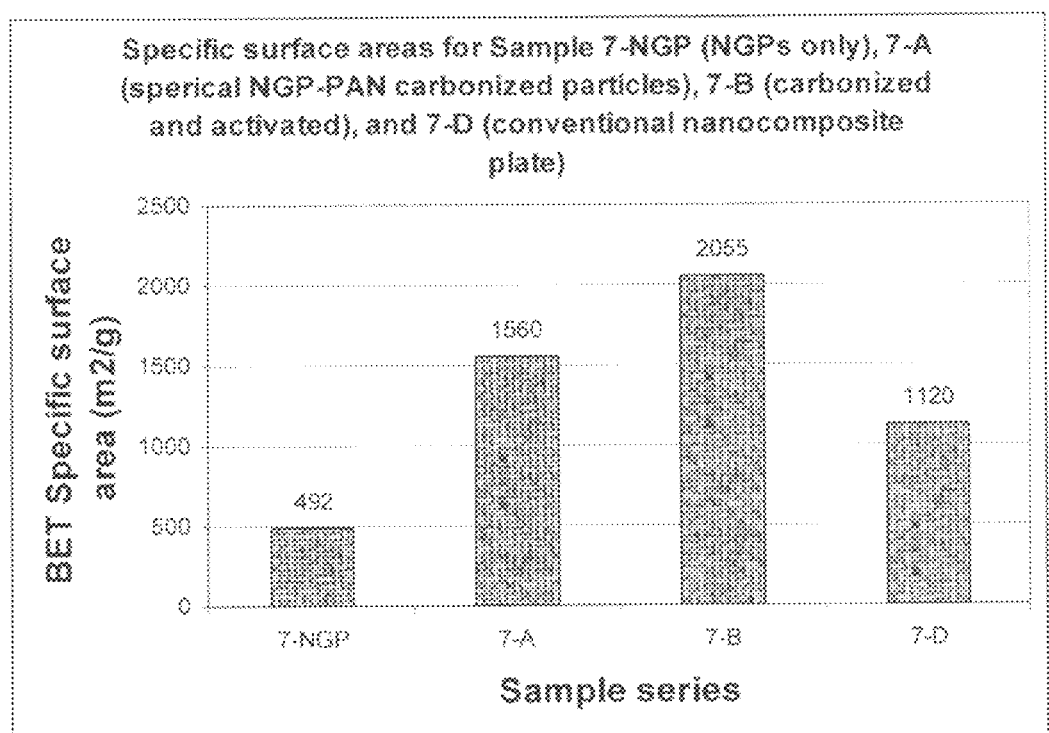
FIG. 7 The specific surface areas of NGPs alone, and several NGP-containing composites: Sample 7-A (carbonized nanocomposite particles), Sample 7-B (carbonized and activated), and Sample 7-D (conventional composite plate after carbonization).

FIG. 7 shows that the specific surface area of NGPs can be significantly increased by mixing NGPs with a first polymer binder or matrix to form nanocomposite solid particles and then carbonizing this polymer. An increase in specific surface area from 492 m²/g for Sample 7-NGP (NGPs only, no binder) to 1560 m²/g for Sample 7-A (NGP-PAN spherical particles, carbonized) was observed. The polymer can be any polymer preferably with a high carbon yield, such as poly(furfuryl alcohol), phenolic-formaldehyde, polyacrylonitrile, and cellulosic polymers. The specific surface area of these carbonized nanocomposite particles was further increased by subjecting Sample 7-A to activation (Sample 7-B). For Sample 7-D, prepared in a conventional manner, the specific surface area is not as high as that of Sample 7-A, prepared according to a preferred embodiment of the present invention. This further establishes the non-obviousness of the present invention.

EXAMPLE 8

Transition Metal Oxide-Bonded NGP Nanocomposite Particles

NGP-containing nanocomposite solid particles (average diameter of approximately 4.8 µm) were obtained from Example 1. They were slightly pressed into a "compact," which was confined in a stainless steel wire mesh cage to be used as an electro-deposition electrode.

It may be noted that a number of transition metal halides bearing a 2,6-bis(imino)piridyl ligand, $LMCl_2$, where L=2,6-$(ArNCCH_3)_2C_5H_3N$ and M=transition metal atom), have been synthesized (prior art). In the present study, the manganese halide complex (M=Mn) was electrochemically deposited onto the wire mesh caged electrode in a water-containing acetonitrile electrolyte (containing 0.1 M of tetra-butyl-ammonium perchlorate). A thin manganese oxide layer was deposited onto the surface of NGP-matrix nanocomposite particles, serving to bond these particles together for forming a supercapacitor electrode. The specific capacitance of the NGP-carbon particles was increased from 68 F/g to 129 F/g. Other transition metal oxides or sulfides can also be used as a source of pseudocapacitance.

In conclusion, we have successfully developed a new and novel class of NGP-based nanocomposites that are superior supercapacitor and lithium ion battery electrode materials. A supercapacitor can make use of this material in one or both of the electrodes. These NGP-based nanocomposites exhibit great capacitance and electrical conductivity. Other desirable features of NGPs include chemical stability and low mass density. They are also of lower costs compared with carbon nano-tube based materials. Both NGPs and NGP-based nanocomposites can be mass-produced cost-effectively. For lithium ion anode applications, the presently invented NGP nanocomposite has the following highly desirable features: high reversible capacity, low irreversible capacity, small particle sizes (for high-rate capacity), compatibility with commonly used electrolytes, and long charge-discharge cycle life.

The invention claimed is:

1. A solid nanocomposite particle for electrochemical cell electrode applications, said nanocomposite particle consisting of individual nano-scaled exfoliated graphene platelets having a thickness less than 100 nm bonded by a first binder material, wherein said exfoliated graphene platelets occupy a weight fraction of 2% to 98% of the total nanocomposite particle weight and said graphene platelets are not obtained from direct graphitization of said first binder material, wherein said solid nanocomposite particle has a substantially spherical or ellipsoidal shape, wherein said exfoliated graphene platelets are obtained from exfoliation and platelet separation of a member of the group consisting of a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, and graphitized polymeric carbon; and wherein said first binder material is selected from a polymer, polymeric carbon, coke, petroleum pitch, coal tar pitch, meso-phase pitch, metal, glass, ceramic, oxide, organic material, or a combination thereof and further wherein said solid particle comprises therein microscopic or meso-scaled pores.

2. The solid nanocomposite particle of claim 1, wherein said particle comprises pores sufficient in sizes to enable transport of ions in a secondary battery or electrolyte in a supercapacitor.

3. The solid nanocomposite particle of claim 1, wherein said first binder material comprises a carbon material obtained by pyrolyzing or heating a polymer, organic material, coal tar pitch, petroleum pitch, meso-phase pitch, or a combination thereof.

4. The solid nanocomposite particle of claim 1, wherein said individual and exfoliated nano-scaled graphene platelets have a thickness less than 100 nm and a length, width, or diameter less than 10 µm.

5. The solid nanocomposite particle of claim 1, wherein said individual and exfoliated nano-scaled graphene platelets have a thickness less than 2 nm, or a length, width, or diameter less than 5 µm.

6. An electrochemical cell comprising an electrode that comprises a solid nanocomposite particle as defined in claim 1.

7. A lithium secondary battery comprising an anode, a cathode, a separator disposed between said anode and said cathode, and an electrolyte in contact with said anode and said cathode, wherein said anode comprises a solid nanocomposite particle of claim 1 as an anode active material.

8. The lithium secondary battery as defined in claim 7, wherein said anode provides a specific capacity of no less than 350 mAh/g.

9. A supercapacitor comprising two electrodes, a separator disposed between said two electrodes, and an electrolyte in ionic contact with the two electrodes, wherein at least one of the two electrodes comprises a solid nanocomposite particle of claim 1 as an electrode active material.

10. The supercapacitor as defined in claim 9, wherein the supercapacitor provides a specific capacitance of no less than 100 Farad per gram of electrode active material.

11. A solid nanocomposite particle for electrochemical cell electrode applications, said nanocomposite particle consisting of individual nano-scaled exfoliated graphene platelets bonded by a first binder material, wherein said graphene platelets occupy a weight fraction of 2% to 98% of the total nanocomposite particle weight and said graphene platelets are not obtained from direct graphitization of said first binder material, and wherein said first binder material is selected from the group consisting of a polymer, polymeric carbon, amorphous carbon, coke, petroleum pitch, coal tar pitch, meso-phase pitch, metal, glass, ceramic, oxide, organic material, and combinations thereof and wherein said solid particle has a substantially spherical or ellipsoidal shape and further wherein said solid particle comprises therein microscopic or meso-scaled pores.

12. A solid nanocomposite particle for electrochemical cell electrode applications, said nanocomposite particle consisting of individual nano-scaled exfoliated graphene platelets bonded by a first binder material, wherein said graphene platelets occupy a weight fraction of 2% to 98 % of the total nanocomposite particle weight and said graphene platelets are not obtained from direct graphitization of said first binder material, wherein said solid nanocomposite particle has a substantially spherical or ellipsoidal shape, and wherein said first binder material is selected from the group consisting of a polymer, polymeric carbon, amorphous carbon, coke, petroleum pitch, coal tar pitch, meso-phase pitch, metal, glass, ceramic, oxide, organic material, and combinations thereof and further wherein said solid particle comprises therein microscopic or meso-scaled pores, 1 nm to 10 nm in size.

13. An electrochemical cell electrode comprising solid nanocomposite particles, wherein
   (a) a solid nanocomposite particle consists of individual exfoliated graphene platelets bonded by a first binder material, wherein said graphene platelets occupy a proportion of no less than 2% by weight of the solid nanocomposite particle weight and said graphene platelets are not obtained from graphitization of said first binder material and wherein said solid nanocomposite particle comprises therein microscopic or meso-scaled pores, 1 nm to 10 nm in size, wherein said solid nanocomposite particle has a substantially spherical or ellipsoidal shape;
   (b) said graphene platelets having a length or width in the range of 10 nm to 10 µm;
   (c) said solid nanocomposite particles being bonded by a second binder material; and
   (d) said first or both said first and said second binder material is selected from the group consisting of a polymer, polymeric carbon, amorphous carbon, coke, petroleum pitch, coal tar pitch, meso-phase pitch, metal, glass, ceramic, oxide, organic material, or a combination thereof.

14. The electrode of claim 13, wherein said solid nanocomposite particles comprise therein microscopic or meso-scaled pores.

15. The electrode of claim 13, wherein said solid nanocomposite particles comprise pores sufficient in sizes to enable transport of ions in a secondary battery or electrolyte in a supercapacitor.

16. The electrode of claim 13, wherein said first binder material comprises a carbon material obtained by pyrolyzing or heating a polymer, organic material, coal tar pitch, petroleum pitch, meso-phase pitch, or a combination thereof.

17. The electrode of claim 13 wherein said individual and exfoliated nano-scaled graphene platelets have a thickness less than 10 nm and/or a length, width, or diameter less than 5 µm.

18. The electrode of claim 13, wherein said individual and exfoliated nano-scaled graphene platelets have a thickness less than 1 nm and/or a length, width, or diameter less than 2 µm.

19. The electrode of claim 13, wherein said multiple solid nanocomposite particles, when measured with or without a second binder, exhibit a specific surface area no less than 500 $m^2/gm$.

20. The electrode of claim 13, wherein said multiple solid nanocomposite particles, when measured with or without a second binder, exhibit a specific surface area no less than 1,000 $m^2/gm$.

21. The electrode of claim 13, wherein said multiple solid nanocomposite particles, when measured with or without a second binder, exhibit a specific surface area no less than 1,500 $m^2/gm$.

22. A supercapacitor comprising two electrodes, a separator disposed between said two electrodes, and an electrolyte in ionic contact with the two electrodes, wherein at least one of the two electrodes comprises said electrode of claim 13.

23. The supercapacitor as defined in claim 22, wherein the supercapacitor provides a specific capacitance of no less than 100 Farad per gram of electrode active material.

* * * * *